(12) United States Patent
Takiguchi et al.

(10) Patent No.: US 9,387,669 B2
(45) Date of Patent: Jul. 12, 2016

(54) TEST METHOD

(71) Applicant: SEIKO EPSON CORPORATION, Tokyo (JP)

(72) Inventors: Hiroshi Takiguchi, Matsumoto (JP); Katsuyuki Moriya, Azumino (JP); Osamu Kasuga, Suwa (JP); Akira Sugawara, Tsuruoka (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/147,385

(22) Filed: Jan. 3, 2014

(65) Prior Publication Data

US 2014/0192110 A1    Jul. 10, 2014

(30) Foreign Application Priority Data

Jan. 7, 2013  (JP) ................. 2013-000360

(51) Int. Cl.

| B41J 29/393 | (2006.01) |
| B41J 2/01 | (2006.01) |
| B41M 5/40 | (2006.01) |
| B41J 2/045 | (2006.01) |
| D21H 19/00 | (2006.01) |
| B41J 2/21 | (2006.01) |
| B41M 5/52 | (2006.01) |
| C09D 11/36 | (2014.01) |

(52) U.S. Cl.

CPC .............. *B41J 2/0456* (2013.01); *B41J 2/2142* (2013.01); *B41M 5/52* (2013.01); *B41M 5/529* (2013.01); *B41M 5/5254* (2013.01); *C09D 11/36* (2013.01); *D21H 19/00* (2013.01)

(58) Field of Classification Search

CPC .... B41J 11/002; B41J 2/2114; B41J 11/0015; B41J 2/0456; B41J 2/0451; B41J 2/04558; B41J 2/2142; B41M 5/52

USPC ................. 347/19, 101, 105, 106; 428/32.34, 428/32.25

See application file for complete search history.

(56) References Cited

U.S. PATENT DOCUMENTS

| 2005/0139338 A1 * | 6/2005 | Shibatani ................. B41M 5/52 162/125 |
| 2009/0130295 A1 | 5/2009 | Broguiere et al. |
| 2010/0128080 A1 | 5/2010 | Ito |
| 2010/0238228 A1 | 9/2010 | Ito |
| 2012/0050432 A1 * | 3/2012 | Kawakami ............. B41M 5/506 347/102 |

FOREIGN PATENT DOCUMENTS

| JP | 2009-000925 A | 1/2009 |
| JP | 2010-119991 A | 6/2010 |
| JP | 2010-214318 A | 9/2010 |
| JP | 2011-505438 | 2/2011 |

* cited by examiner

*Primary Examiner* — Jannelle M Lebron

(74) *Attorney, Agent, or Firm* — Maschoff Brennan

(57) ABSTRACT

A test method includes preparing a test medium including a base and an ink-receiving layer that absorbs ink to swell in the thickness direction thereof, applying an ink onto the ink-receiving layer by ejecting droplets of the ink from a liquid ejecting apparatus, and observing the test medium.

15 Claims, 4 Drawing Sheets

TEST METHOD

BACKGROUND

1. Technical Field

The present invention relates to a test method.

2. Related Art

An ink jet method is one of the conventional techniques for recording on a recording medium with an ink containing a coloring material. The ink jet method is advantageous in favorably forming a fine pattern.

A liquid ejecting apparatus used for the ink jet method is adjusted for properties involved in ejecting ink, such as the waveform of applied voltage, before use. As disclosed, for example, in JP-A-2010-214318, for this adjustment, an ink that will be used in the liquid ejecting apparatus is ejected on a test medium (test work) for determining the amount of ejected droplets and the accuracy of landing positions of the droplets. The amount of ejected droplets is calculated from the diameters of droplets deposited on the test medium, and the accuracy of landing positions is determined from the positions of droplets having landed on the test medium.

However, if the ink used for the ink jet method contains little or no coloring agent, it may be difficult to measure or detect the amount and landing positions of ejected droplets in some cases.

In addition, in the ink jet method, the solid content of ink is liable to be trapped around the nozzles of the liquid ejecting apparatus. This causes the amount of ejected ink to vary with time, or degrades the accuracy in the landing position of the ink. Accordingly, the nozzles are cleaned at regular intervals to solve these problems, and then, if necessary, the above-described measurements for the amount of ejected droplets and the landing position are performed. In such a case, however, the same problems are likely to occur when the ink contains little or no coloring agent.

SUMMARY

An advantage of some aspects of the invention is that it provides an accurate test method for measuring or detecting the amount and positions of droplets ejected by an ink jet method.

According to an aspect of the invention, a test method is provided. In the test method, a test medium is prepared which includes a base and an ink-receiving layer that absorbs ink to swell in the thickness direction thereof, and an ink is applied to the ink-receiving layer by ejecting droplets of the ink from a liquid ejecting apparatus by an ink jet method. Then, the test medium is observed. The test method can accurately measure or detect the amount and positions of droplets ejected by an ink jet method.

Preferably, the observing of the test medium is performed through a microscope including an epi-illumination lighting device. Thus, the observation of the test medium is performed in such a manner that the contrast between the contour of the portion of test medium that has absorbed the ink and the region adjacent thereto is enhanced. Consequently, the size of the ink-absorbed portion and the position thereof can be accurately measured or detected.

Preferably, the observing of the test medium includes measuring the volume of the droplets ejected from the liquid ejecting apparatus. It is very important for a liquid ejecting apparatus to eject an accurate volume (amount) of ink droplets. The accuracy in the volume (amount) of ink droplets is significant for the quality of recorded articles produced with a liquid ejecting apparatus. In the test method, the volume of ink droplets can be accurately measured. By measuring the volume of ink droplets ejected from a liquid ejecting apparatus as part of the observing of the test medium, the test method can produce an advantageous effect.

Preferably, the observing of the test medium includes detecting positional information of the droplets ejected from the liquid ejecting apparatus. It is very important for a liquid ejecting apparatus to eject ink droplets to correct positions. The accuracy in the landing positions of ink droplets is significant for the quality of recorded articles produced with a liquid ejecting apparatus. In the test method, the landing positions of the ink droplets can be accurately detected. By detecting the landing positions of the droplets ejected from a liquid ejecting apparatus as part of the observing of the test medium, the test method can produce an advantageous effect.

Preferably, the observing of the test medium includes detecting stain of mist generated by ejecting ink droplets from the liquid ejecting apparatus. Stain of the mist has a significant effect on the quality of recorded articles produced with a liquid ejecting apparatus. In the test method, the stain of the mist can be sensitively and accurately detected. By detecting stain of mist generated by ejecting ink droplets from a liquid ejecting apparatus as part of the observing of the test medium, the test method can produce an advantageous effect.

Preferably, the ink receiving layer absorbs 0.2 g or more of the ink per gram thereof, and the base absorbs 0.1 g or less of the ink per gram thereof. Such ink absorption allows the ink-absorbed portion of the ink-receiving layer to swell selectively and efficiently, and thus, the amount and positions of droplets ejected by an ink jet method are accurately measured.

Preferably, the ink-receiving layer is made of a material containing a coloring agent. The ink-absorbed portion of such an ink-receiving layer is easy to recognize, and thus, the amount and positions of droplets ejected by an ink jet method are accurately measured.

Preferably, the ink-receiving layer contains polyvinyl butyral. The ink-absorbed portion of such an ink-receiving layer is easy to recognize, and thus, the amount and positions of droplets ejected by an ink jet method are accurately measured.

Preferably, the polyvinyl butyral contains 10% to 40% by mass of vinyl alcohol having a hydroxy group that is not acetalized or etherified, or esterified. Thus, the affinity of the ink receiving layer with the ink is enhanced, and the ink can be appropriately retained at the position of the ink-receiving layer where the ink has landed in the ink application step. Consequently, the amount and positions of droplets ejected by an ink jet method can be accurately measured.

Preferably, the ink-receiving layer is made of a material containing an anionic acrylic silicone. Such an ink-receiving layer prevents the ink applied to the test medium effectively from spreading excessively, and thus allows the ink-applied portion thereof to swell appropriately in the thickness direction of the ink-receiving layer. Thus, the amount and positions of droplets ejected by an ink jet method are accurately measured.

Preferably, the ink receiving layer has a thickness in the range of 10 to 500 μm. Such an ink-receiving layer certainly absorbs the ink applied to the test medium, and allows the ink-applied portion thereof to swell in the thickness direction. Thus, the amount and positions of droplets ejected by an ink jet method are accurately measured. In addition, the ink-receiving layer can absorb a wide range of amount of ink ejected by an ink jet method.

Preferably, the base contains a compound selected from the group consisting of polyethylene terephthalate, polybutylene terephthalate, polycarbonate, polyimide, polyacrylate, polyacetal, polyvinylidene chloride, and polyphenylene sulfide. The ink-absorbed portion of such an ink-receiving layer is easy to recognize, and thus, the amount and positions of droplets ejected by an ink jet method are accurately measured.

Preferably, the ink contains an organic solvent having a boiling point of 100° C. or more. Such an ink can be appropriately retained at the portion of the ink-receiving layer where the ink has landed. Thus, the amount and positions of ink droplets ejected by an ink jet method are accurately measured.

Preferably, the ink contains an aprotic aromatic compound as a liquid component. Thus, the affinity of the solvent of the ink with the ink-receiving layer is enhanced, and the ink can be appropriately retained at the position of the ink-receiving layer of the test medium where the ink has landed. Consequently, the amount and positions of droplets ejected by an ink jet method can be accurately measured.

Preferably, the ink does not contain a coloring agent. In the known test method, the measurements of the amount and positions of ink droplets ejected by an ink jet method are performed for inks containing coloring agents. However, this test method cannot provide satisfactory accuracy in the amount and positions of ejected ink droplets for inks not containing a coloring agent. On the other hand, in the test method of an embodiment of the invention, the amount and positions of ejected ink droplets can be accurately determined for inks not containing a coloring agent as well as for inks containing a coloring agent. Thus, the test method is particularly effective when the ink does not contain a coloring agent.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
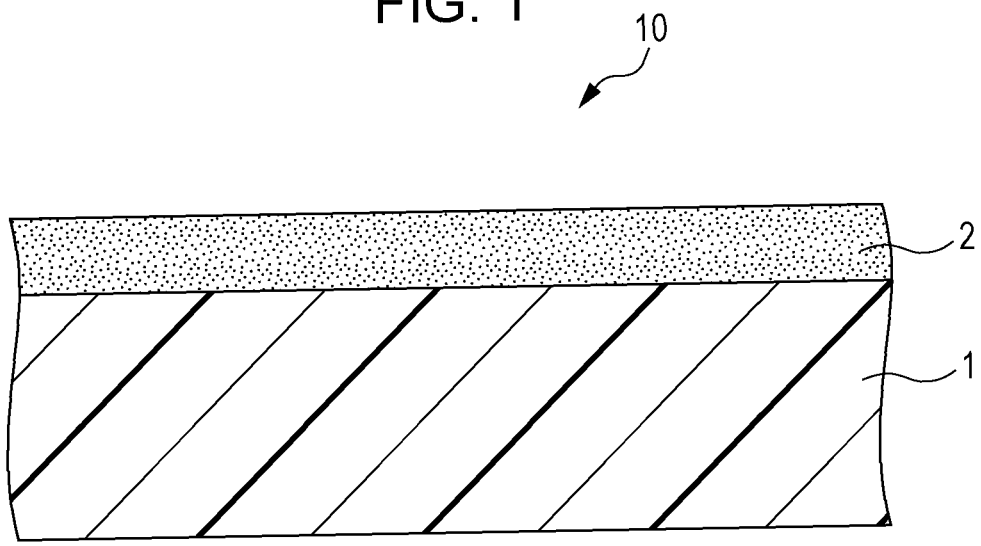
FIG. 1 is a schematic sectional view of a test medium used in a test method according to an embodiment of the invention.
Figure 2:
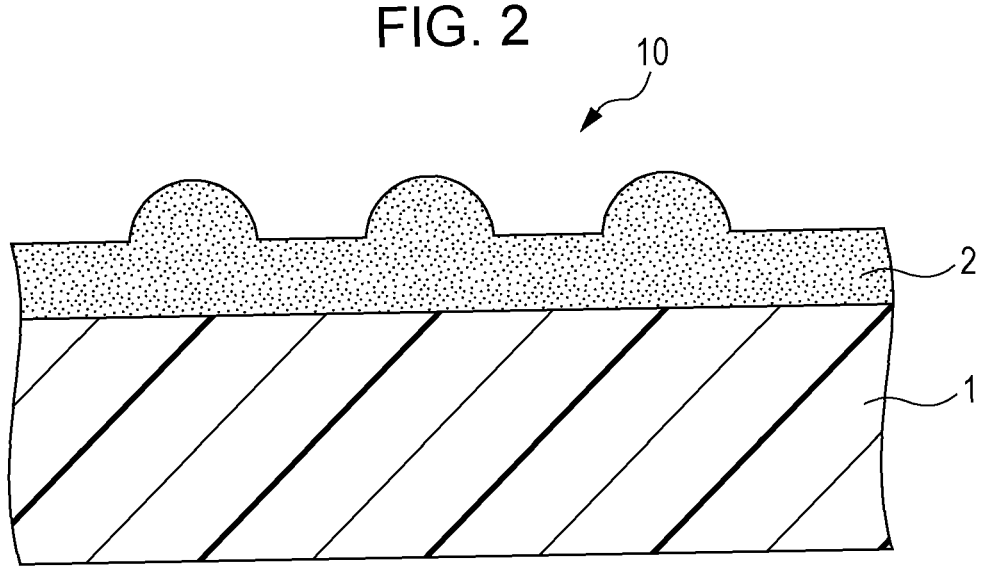
FIG. 2 is a schematic sectional view of the test medium shown in FIG. 1 that has absorbed an ink.
Figure 3:
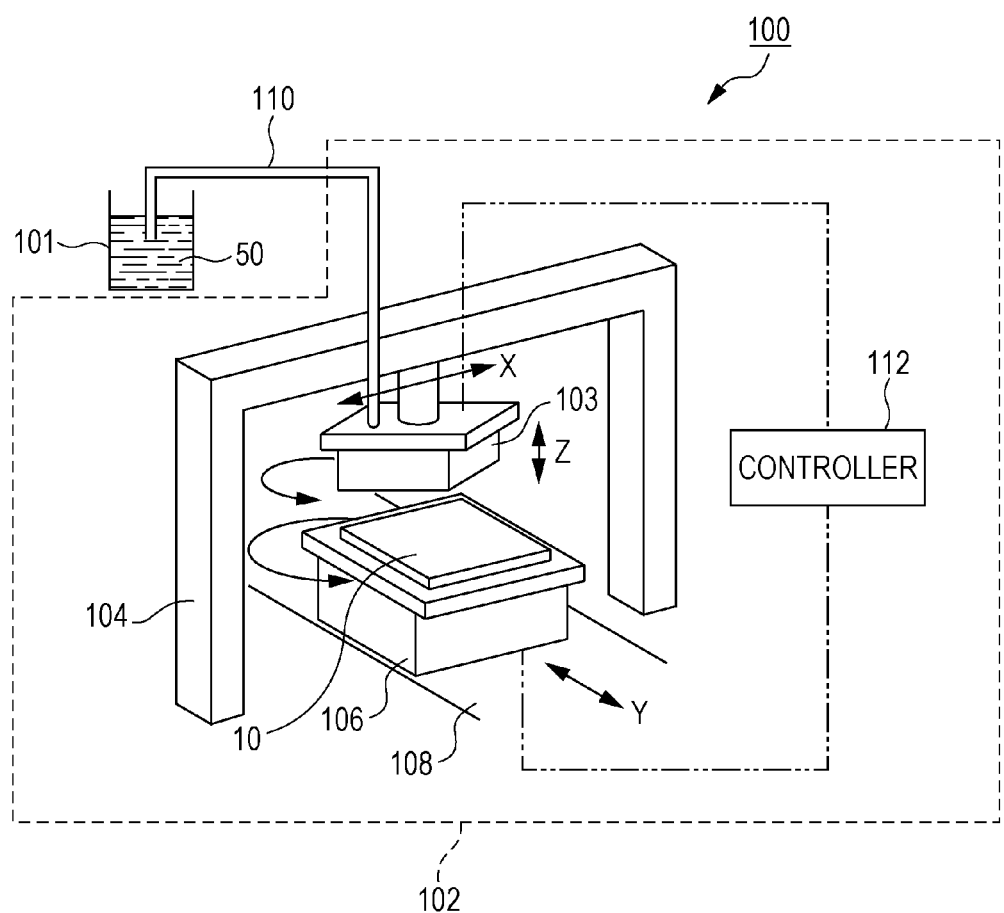
FIG. 3 is a perspective view of a liquid ejecting apparatus used for ejecting an ink.

Exemplary embodiments of the invention will be described in detail with reference to the drawings.
Test Method FIG. 1 is a schematic sectional view of a preferred test medium used in a test method of an embodiment of the invention. FIG. 2 is a schematic sectional view of the test medium shown in FIG. 1 that has absorbed an ink. FIG. 3 is a perspective view of a liquid ejecting apparatus used for ejecting an ink. The test method of the present embodiment includes the preparation step (1a) of preparing a test medium 10, the ink application step (1b) of applying an ink onto the ink-receiving layer 2 of the test medium 10, and the observation step (1c) of observing the test medium 10.

Preparation Step

First, a test medium 10 is prepared (1a). In this step, the test medium 10 is placed on a stage 106 of a liquid ejecting apparatus 100, which will be described later. The test medium 10 includes a base 1 and an ink-receiving layer 2 that absorbs ink to swell in the thickness direction.

The test medium 10 will be further described in detail.
Base

The base 1 supports the ink-receiving layer 2. The base 1 may be made of any material as long as the base 1 can support the ink-receiving layer 2, and preferably, the base 1 absorb 0.1 g or less, more preferably 0.01 g or less, of ink per gram thereof after the ink has been applied onto the test medium 10. When the ink absorption of the base 1 is as low as these ranges, the difference in ink absorption between the base 1 and the ink-receiving layer 2 increases sufficiently. This allows the ink-absorbed portion of the ink-receiving layer 2 to swell selectively and efficiently in the ink application step (described later). Consequently, the amount and positions of ink droplets ejected by an ink jet method can be accurately measured in the observation step (described later).

The ink absorption of the base 1 can be determined as below. A test piece of an object member (sheet) of 20 mm by 20 mm by 1 mm is immersed in an ink having a controlled temperature of 25° C. for one hour, and the weight of the test piece is measured. The ink absorption is calculated from the increase in the weight of the test piece.

The base 1 is made of, for example, plastic, metal, ceramic, semiconductor, glass, fiber material, or paper, and preferably contains a material selected from the group consisting of polyethylene terephthalate, polybutylene terephthalate, polycarbonate, polyimide, polyacrylate, polyacetal, polyvinylidene chloride, and polyphenylene sulfide. Such a base helps recognize the ink-absorbed portion of the ink-receiving layer 2, and thus, the amount and positions of ink droplets ejected by an ink jet method can be accurately measured in the observation step. This effect will be markedly produced when the base 1 contains at least one of polyethylene terephthalate, polybutylene terephthalate, polycarbonate, polyimide, polyacrylate, polyacetal, polyvinylidene chloride and polyphenylene sulfide with a total content of 80% by mass or more.

If the base 1 contains polyethylene terephthalate, the polyethylene terephthalate content in the base 1 is preferably 50% by mas or more, and more preferably 80% by mass or more. Such a base is superior in heat resistance, flatness, flexibility, and tensile strength.

The base 1 may be made of a single composition or a composite including portions made of different compositions. For example, the base 1 may have a multilayer structure including a plurality of layers made of different compositions, or a structure made of a graded material whose composition varies gradually in the thickness direction.

The base 1 may contain materials other than the above-mentioned compounds. Examples of the material that may be additionally added to the base 1 include carbon, titania, alumina particles, silica, mica, calcium carbonate, and calcium silicate. If the base 1 contains such a material, its content is preferably 20% by mass or less, and more preferably 5% by mass or less.

The base 1 may be in any form, and is preferably in the form of sheet. The base 1 in a sheet form is suitable to be used in ink jet apparatuses (liquid ejecting apparatuses).

The thickness of the base 1 is preferably in the range of 10 to 500 μm, and more preferably 50 to 200 μm. Such a base provides a test medium 10 particularly stable in shape and easy to handle.

Ink-Receiving Layer

The ink-receiving layer 2 absorbs ink. The absorption of ink swells the ink-receiving layer 2 in the thickness direction as shown in FIG. 2. Since the portion that has absorbed ink changes selectively and three-dimensionally in shape, the position of this ink-absorbed portion and the volume of the ink absorbed in the portion (volume of ink droplets) can be easily and accurately determined in the observation step. In addition, stain of mist generated by ejecting ink (hereinafter referred to as satellites) can be easily and sensitively detected. Although it is difficult to detect satellites of an ink containing no coloring agent (substantially colorless ink, for example, having a transmittance of 90% or more for visible light having a wavelength of 500 nm), the use of the ink-receiving layer 2 allows the landing positions of the ink droplets and the volume of the landed droplets to be accurately determined.

Preferably, the ink-receiving layer 2 can absorb 0.2 g or more, more preferably in the range of 0.5 to 2.0 g, of ink per gram thereof after the ink has been applied onto the test medium 10. When the ink absorption of the ink-receiving layer 2 is as high as the above range, the difference in ink absorption between the base 1 and the ink-receiving layer 2 increases sufficiently. This allows the ink-absorbed portion of the ink-receiving layer 2 to swell selectively and efficiently in the ink application step. Consequently, the amount and positions of ink droplets ejected by an ink jet method can be accurately measured in the observation step.

The ink absorption of the ink-receiving layer 2 can be determined as below. Droplets of an ink having a controlled temperature of 25° C. are dropped slowly one after another to a sheet of an object member (100 µm in thickness) tilted at an angle of 45° until the test piece is saturated with the ink and the ink begins to transfer by gravity. The ink absorption is defined as the ratio (Wi/Ws) of the weight (Wi) of the ink in the sheet per unit area at the time when the ink begins to transfer by gravity to the weight (Ws) per unit area of the portion of the sheet that has come into contact with the ink.

Any material may be used as the ink-receiving layer 2 as long as it can absorbs ink to swell in the thickness direction, and preferably contains one or more compounds selected from the group consisting of acrylic resins (including modified acrylic resins), acrylonitrile-styrene copolymers (AS resins), acrylonitrile-butadiene-styrene copolymers (ABS resins), methylmethacrylate-styrene copolymers (MS resins), methylmethacrylate-butadiene-styrene copolymers (MBS resins), polystyrene resins, polystyrene rubbers, polyvinyl butyral (PVB), styrene-allyl alcohol copolymers, polyvinylpyrrolidone (PVP), polyacrylamide (PAA), and polyvinyl alcohols (PVA). More preferably, the ink-receiving layer 2 contains polyvinyl butyral. Such an ink-receiving layer helps recognize the ink-absorbed portion of the ink-receiving layer 2, and thus, the amount and positions of ink droplets ejected by an ink jet method can be accurately measured in the observation step.

This effect can be more markedly produced particularly when the base 1 contains polyethylene terephthalate and the ink-receiving layer 2 contains polyvinyl butyral. In this instance, in addition, the adhesion of the ink-receiving layer 2 to the base 1 is increased, and consequently, the test medium 10 can be reliably used to provide accurate results even under conditions of high temperature or large variation in temperature.

Polyvinyl butyral is produced by partially acetalizing (butyralizing) polyvinyl alcohol with butyraldehyde. The polyvinyl butyral used for the ink-receiving layer 2 may contain a vinyl alcohol whose hydroxy group has been esterified with acetic acid or the like.

If the ink-receiving layer 2 contains a polyvinyl butyral, the polyvinyl butyral may contain 10% to 40% by mass, preferably 20% by mass or less, of vinyl alcohol having a hydroxy group that is not etherified or acetalized, or esterified. Thus, the affinity of the solvent of ink with the ink-receiving layer 2 can be enhanced. Thus, the ink can be appropriately retained at the position of the ink-receiving layer 2 of the test medium 10 where the ink has landed in the ink application step. Consequently, the amount and positions of droplets ejected by an ink jet method can be accurately measured.

If the ink-receiving layer 2 contains polyvinyl butyral, the polyvinyl butyral content in the ink-receiving layer 2 is preferably in the range of 40% to 99% by mass, and more preferably 60% to 98% by mass. Such an ink-receiving layer 2 can absorb a particularly large amount of ink, and thus can swell to change the shape fully in a short time. Accordingly, the test medium 10 can be appropriately observed in a short time after the ink has landed. Also, since the test medium 10 will certainly absorb ink to change in shape before the ink spreads gradually over the medium, the occurrence of an error resulting from the spreading can be reduced, and the positions of closely landed droplets with a small diameter can be accurately observed.

Preferably, the ink-receiving layer 2 is made of a material containing an anionic acrylic silicone. Such an ink-receiving layer prevents the ink applied to the test medium 10 effectively from spreading excessively, and thus allows the ink-applied portion to swell appropriately in the thickness direction of the ink-receiving layer 2. Thus, the amount and positions of ink droplets ejected by an ink jet method are accurately measured.

Examples of the anionic acrylic silicone include AQ 7130 (produced by Kusumoto Chemicals), AQ 914 and ASi-91 (each produced by Daicel FineChem), SILAS PC-751 (produced by Toagosei), FB (produced by Murayama Kagaku Kenkyujo), and NE-500 (produced by Shin-Etsu Chemical).

If the ink-receiving layer 2 contains an anionic acrylic silicone, the anionic acrylic silicone content in the ink-receiving layer 2 is preferably 5% by mass or less, and more preferably 2% by mass or less. Such an ink-receiving layer prevents the ink applied to the test medium 10 effectively from spreading excessively, and can absorb the applied ink in a short time so that the ink-applied portion of the ink-receiving layer 2 can swell appropriately in the thickness direction. Consequently, the occurrence of an error resulting from the spreading can be further reduced relative to the case where the ink-receiving layer 2 does not contain an anionic acrylic silicone, and thus the positions of closely landed droplets with a small diameter can be accurately observed.

Preferably, the ink-receiving layer 2 is made of a material containing a coloring agent. The ink-absorbed portion of such an ink-receiving layer 2 is easy to recognize, and thus, the amount and positions of ink droplets ejected by an ink jet method are accurately measured. More specifically, since the contrast between the outer region (contour) of the portion that has absorbed the ink and the other region of the test medium 10 is enhanced, the amount and positions of ink droplets ejected by an ink jet method are accurately measured when the test medium 10 is observed after the ink has been applied.

If the ink-receiving layer 2 contains a coloring agent, the coloring agent content in the ink-receiving layer 2 is preferably 10% by mass or less, more preferably 5% by mass or less, so that the absorption of ink is not inhibited. By adding a coloring agent, the reflection from the rear surface of the base 1, the reflection from the interface between the ink-receiving layer 2 and the base 1, and the internal reflection in the ink-receiving layer 2 can be sufficiently reduced. Thus, the reflection from the uneven surface of the ink-receiving layer 2 is relatively intensified, and accordingly, rapid changes in reflection from the surface of the contour of the ink-absorbed portion can be clearly observed with a high contrast.

The coloring agent in the ink-receiving layer 2 may be a pigment or a dye, and is preferably a dye. Since dyes can be more easily dispersed than pigments, the ink-receiving layer 2 (molecules of the ink-receiving layer) can be deeply colored uniformly by simply mixing a dye for a short time.

The color of the ink-receiving layer 2 is preferably, but is not limited to, blue (the ink-receiving layer preferably contains a blue coloring agent). The ink-absorbed portion of such an ink-receiving layer 2 is easy to recognize, and thus, the amount and positions of ink droplets ejected by an ink jet method can be accurately measured in the observation step.

The ink-receiving layer 2 may be made of a single composition or a composite including portions made of different compositions. For example, the ink-receiving layer 2 may have a multilayer structure including a plurality of layers made of different compositions, or a structure made of a graded material whose composition varies gradually in the thickness direction. If the ink-receiving layer 2 contains an anionic acrylic silicone, the ink-receiving layer 2 may include a region, near the external surface thereof, containing the anionic acrylic silicone with a higher content than the other region. Such an ink-receiving layer prevents the ink applied to the test medium 10 effectively from spreading excessively, and can absorb the applied ink in a short time so that the ink-applied portion of the ink-receiving layer 2 can swell appropriately in the thickness direction.

Preferably, the thickness of the ink-receiving layer 2 is in the range of 10 to 500 µm, and more preferably 30 to 200 µm. Such an ink-receiving layer certainly absorbs the ink applied to the test medium 10 in the ink application step, and allows the ink-applied portion thereof to swell appropriately in the thickness direction. Thus, the amount and positions of ink droplets ejected by an ink jet method are accurately measured in the observation step. In addition, the ink-receiving layer 2 can absorb a wide range of amount of ink ejected by an ink jet method.

The ink-receiving layer 2 may further contain other constituents. For example, it may be contain polyurethane, polyepoxy, polyamine, or the like. If the ink-receiving layer 2 contains such a constituent, its content is preferably 40% by mass or less, more preferably 20% by mass or less.

Ink Application Step

Subsequently, an ink is applied onto the ink-receiving layer 2 of the test medium 10 from a liquid ejecting apparatus by an ink jet method (1b). In the ink-application step described below, the ink may be ejected from a liquid ejecting apparatus as shown in FIG. 3.

As shown in FIG. 3, the liquid ejecting apparatus 100 includes a reservoir 101 holding an ink 50, a tube 110, and an ejection scanning portion 102 to which the ink 50 is supplied from the reservoir 101 through the tube 110. The ejection scanning portion 102 includes a liquid ejecting unit 103 including a plurality of liquid ejecting heads (ink jet heads) mounted on a carriage, a first positional control device (transfer device) 104 that controls the position of the liquid ejecting unit 103, a stage 106 that supports the test medium (recording medium) 10 thereon, a second positional control device (transfer device) 108 that controls the position of the stage 106, and a controller 112. The reservoir 101 is connected to the liquid ejecting heads of the liquid ejecting unit 103 with the tube 110 so that the ink 50 can be supplied to each liquid ejecting head from the reservoir 101 by compressed air.

The first positional control device 104 transfers the liquid ejecting unit 103 in the X direction and the Z direction perpendicular to the X direction according to the signal from the controller 112. The first positional control device 104 also rotates the liquid ejecting unit 103 on an axis parallel to the Z direction. In the present embodiment, the Z direction is parallel to the acceleration of gravity. The second positional control device 108 transfers the stage 106 in the Y direction parallel to both the X and the Z direction according to the signal from the controller 112. The second positional control device 108 also rotates the stage 106 on an axis parallel to the Z direction.

The stage 106 has a flat surface parallel to both the X and the Y direction. The stage 106 is configured so as to fix or hold the test medium (recording medium) 10, to which the ink 50 will be applied, on the flat surface. The liquid ejecting unit 103 is transferred in the X direction by the first positional control device 104, as mentioned above. On the other hand, the state 106 is transferred in the Y direction by the second positional control device 108. In other words, the positions of the liquid ejecting heads are changed relative to the position of the stage 106 by the first positional control device 104 and the second positional control device 108, and thus the test medium 10 on the stage 106 and the liquid ejecting unit 103 are transferred relative to each other.

The controller 112 is configured so as to receive ejection data from an external information processor. The ejection data includes information of the relative position to which the ink 50 is to be ejected. The ink 50 is ejected onto the test medium 10 using the liquid ejecting apparatus 100 or an equivalent apparatus. The use of such an apparatus allows the ink 50 to be selectively and efficiently ejected to desired positions on the test medium 10. Although the liquid ejecting apparatus 100 shown FIG. 3 is composed of a single set of components, including the reservoir 101 and the tube 110, for ejecting a single ink 50, a liquid ejecting apparatus of another embodiment may include a plurality of sets of components for ejecting a plurality of inks.

The liquid ejecting heads each may include a piezoelectric element or an electrostatic actuator as a driving element. Alternatively, the liquid ejecting head may include an electrothermal conversion element as the driving element so as to eject ink by the thermal expansion of a material with the electrothermal convention element.

Ink

The ink used in the ink application step will now be described. The ink 50 to be applied to the test medium 10 preferably contains an organic solvent having a boiling point of 100° C. or more, more preferably 200° C. or more. Such an organic solvent prevents the ink 50 from drying (prevents liquid components from evaporating) effectively after being ejected, and allows the ink 50 deposited on the test medium 10 to be retained appropriately at the position of the ink-receiving layer 2 where the ink 50 has landed. Consequently, the amount and positions of ink droplets ejected by the ink jet method can be accurately measured.

Preferably, the organic solvent accounts for 95% by mass or more, more preferably 99% by mass or more, still more preferably 99.5% by mass or more, of all the liquid components of the ink 50. Such an ink can markedly produce the above-described effect.

Examples of the organic solvent used in the ink 50 include n-octane and other linear hydrocarbons; alicyclic compounds, such as methylcyclohexane, methylcyclohexane, and cyclohexyl amine; heterocyclic compounds, such as 1,4-dioxane, pyridine, N-methylmorpholine, morpholine, and N-ethylmorpholine; aromatic compounds, such as toluene, ethylbenzene, xylene, styrene, chlorobenzene, and pyridine; ketones, such as methyl n-propyl ketone, diethyl ketone, methyl isobutyl ketone, methyl n-butyl ketone, ethyl n-butyl ketone (3-hepthanone), 2-hepthanone, methyl isoamyl ketone, 4-methyl-3-pentene-2-one (mesityl oxide); carboxylic acids, such as formic acid and acetic acid; nitro compounds, such as nitromethane, nitroethane, 2-nitropropane, and 1-nitropropane; ester compounds, such as sec-butyl acetate, n-propyl acetate, methyl butyrate, iso-butyl acetate, n-butyl acetate, isobutyl isobutyrate, amyl acetate, methyl lactate, 1-methylpentyl acetate, 2-methoxyethyl acetate (ethylene glycol methyl ether acetate), propylene glycol methyl ether acetate, and propylene glycol methyl ether acetate; alcohols, such as 2-methyl-2-butanol, isobutanol, n-butanol, 2-methyl-1-butanol, 1-pentanol, 2-ethyl-1-butanol, 2-methyl-1-pentanol, 1-methoxy-2-butanol, methylisobutyl carbinol (4-methyl-2-pentanol), methyl lactate, and N,N-dimethylethanolamine; ether compounds, such as propylene glycol, monomethyl ether, ethylene glycol monomethyl ether, ethylene glycol monoethyl ether, propylene glycol monopropyl ether, 2-methoxyethyl acetate (ethylene glycol methyl ether acetate), propylene glycol methyl ether acetate, propylene glycol methyl ether acetate, 1-methoxy-2-butanol, 3-methoxypropyl amine; amines, such as di-n-propylamine, ethylenediamine, 3-methoxypropylamine, N,N-dimethylethanolamine, cyclohexylamine, pyridine, N-methylmorpholine, morpholine, and N-ethylmorpholine; diethyl carbonate and other carbonate esters; butyronitrile and other nitrile compounds; and acrylic/methacryl compounds, such as phenoxyethyl acrylate, hydroxybutyl acrylate, VEEA, ethyl Carbitol acrylate, phenoxyethyl methacrylate, and pentamethylpiperidinyl methacrylate.

The ink 50 to be applied to the test medium 10 in the ink application step preferably contains an aprotic aromatic compound, such as toluene, ethylbenzene, xylene, styrene, or chlorobenzene, as a liquid component (organic solvent). Such a compound enhances the affinity of the solvent in the ink 50 with the ink-receiving layer 2 of the test medium 10. Consequently, the ink 50 can be appropriately retained at the position of the ink-receiving layer 2 where the ink has landed, and thus the amount and positions of ink droplets ejected by an ink jet method can be accurately measured. Examples of the aprotic aromatic compound include toluene, ethylbenzene, xylene, styrene, and chlorobenzene.

Preferably, the ink 50 does not contain a coloring agent. In the known test method, the measurements of the amount and positions of ink droplets ejected by an ink jet method are performed for inks containing coloring agents. However, this test method cannot provide satisfactory accuracy in the amount and positions of ejected ink droplets for inks not containing a coloring agent. On the other hand, in the test method of an embodiment of the invention, the amount and positions of ejected ink droplets can be accurately determined for inks not containing a coloring agent as well as for inks containing a coloring agent. Thus, the test method is particularly effective when the ink 10 does not contain a coloring agent.

The ink 50 to be applied to the test medium 10 in the ink application step may be used for any application including general consumer use, and is preferably intended for industrial use. In industrial use, it is much required that a constant amount of ink droplets is accurately ejected to desired positions. The test method of the present embodiment allows the amount and positions of ink droplets to be accurately measure, and accordingly, the above-described effect can be produced effectively when an industrial ink jet ink is used. Many of the industrial inks including medical or biological liquids, such as culture media, fluorescent test agents, UV-curable agents, and transparent electroconductive materials, do not contain any coloring agent and are accordingly colorless and have high light transmittance. In the test method of the present embodiment, the amount and positions of droplets of such an ink can be accurately measured.

If the ink 50 to be applied to the test medium 10 is used for manufacturing organic EL devices, the constituents of the ink 50 are required to be highly pure and cannot be colored, and the coating of the ink is very thin. In the test method of the present embodiment, a highly accurately controlled amount of ink can be applied without using an optical technique, such as use of fluorescence, which may damage the material.

Observation Step

Subsequently, the test medium 10 to which the ink 50 has been applied is observed (1c). In this step, the test medium 10 may be checked for abnormality in the liquid ejecting apparatus 100 used for ejecting the ink 50, for the variation in liquid ejection properties among nozzles, and for need to adjust the waveform of applied voltage.

Preferably, in the observation step, the test medium is observed through a microscope including an epi-illumination lighting device. Thus, the observation of the test medium 10 is performed in a state where the contrast between the contour of the portion of the test medium 10 that has absorbed the ink 50 and the region adjacent thereto is enhanced. Consequently, the size of the ink-absorbed portion and the position thereof can be accurately measured.

For epi-illumination lighting, preferably, the central axis of the lighting (extending in the epi-illumination direction) forms an angle (absolute value) of 3° or less, more preferably 1° or less, still more preferably 0°, with the normal to the test medium 10. Thus the portion of the test medium swelled by the applied ink can be photographed as a perfect circle. On the other hand, if the angle (absolute value) between the central axis of the lighting (extending in the epi-illumination direction) and the normal to the test medium 10 is excessively large, the shadow of swelled dots is shaded in such a manner that the portion that should look circular may look chipped.

In the observation step, preferably, the volume of droplets of the ink 50 ejected from the liquid ejecting apparatus 100 is measured. It is very important for a liquid ejecting apparatus to eject an accurate volume (amount) of ink droplets. The accuracy in the volume (amount) of ink droplets is significant for the quality of recorded articles produced with a liquid ejecting apparatus. In the test method, the volume of the ink can be accurately measured. By measuring the volume of droplets of the ink 50 ejected from the liquid ejecting apparatus 100 in the observation step, the test method can produce an advantageous effect. In the method of the present embodiment, the measurement of the volume of ink droplets include measuring the diameter of dots formed of ink droplets on the test medium and the variation in volume among the ink droplets (relative relationship), in addition to measuring the volume (in terms of picoliter) of the ink droplets.

In the observation step, preferably, the positional information of droplets of the ink 50 ejected from the liquid ejecting apparatus 100 is detected. It is very important for a liquid ejecting apparatus to eject ink droplets to correct positions. The accuracy in the landing positions of ink droplets is significant for the quality of recorded articles produced with a liquid ejecting apparatus. In the test method, the landing positions of the ink droplets can be accurately detected. By detecting the landing positions of droplets of the ink 50 ejected from the liquid ejecting apparatus 100 in the observation step, the test method can produce an advantageous effect.

In the observation step, preferably, stain of mist generated by ejecting the ink 50 from the liquid ejecting apparatus 100 is detected. Stain of the mist has a significant effect on the quality of recorded articles produced with a liquid ejecting apparatus. In the test method, the stain of the mist can be sensitively and accurately detected. By detecting the stain of mist generated by ejecting the ink 50 from the liquid ejecting apparatus 100 in the observation step, the test method can produce an advantageous effect. In the method of the present embodiment, the detection of the stain of mist include measuring the amount of mist generated, and obtaining positional information of the stain, and checking if the amount of mist generated by liquid ejection is smaller than a predetermined value (detection limit). In the observation step of the present embodiment, the test medium is photographed to take image data with a CCD camera or any other image pick-up device, and the image date is subjected to a predetermined processing (image processing) for observation.

While the invention has been described with reference to an exemplary embodiment, it is to be understood that the invention is not limited to the disclosed embodiment. For example, although the test medium used in the above-described embodiment includes the base and the ink-receiving layer, the test medium may further include another layer or member in addition to the base and the ink-receiving layer. For example, an intermediate layer may be disposed between the base and the ink-receiving layer. Such an intermediate layer may enhance the adhesion between the base and the ink-receiving layer. Alternatively, the external surface of the test medium (opposite the ink-receiving layer) may be covered with a coating. Such a coating may increase the reflectance of light from the ink-receiving layer to increase the amount of base light. Since the amount of background light is thus increased, the contrast between the background and a dark portion is enhanced. Consequently, the portion that has absorbed ink changes in shape and the edge of that portion can be recognized more clearly. The accuracy of the observation thus can be increased.

EXAMPLES

The invention will be further described in detail with reference to Examples. The invention is not, however, limited to the examples.

Example 1

(1) Preparation of Test Medium (Preparation Step)

First, a 100 μm thick polyethylene sheet (base) having a smooth surface was prepared. The surface roughness Ra of the sheet was 0.2 μm.

An ink-receiving layer composition was applied onto one side of the sheet. The ink-receiving layer composition was prepared by mixing a polyvinyl butyral, tetrahydrofuran, an anionic acrylic silicone AQ 7130 (produced by Kusumoto Chemicals), and a blue dye C.I. Solvent Blue 5. The polyvinyl butyral contained 85% by mass of a vinyl alcohol acetalized with butyraldehyde, 3% by mass of a vinyl alcohol esterified with acetic acid, and 12% by mass of a vinyl alcohol having a hydroxy group not etherified or acetalized, or esterified.

The sheet onto which the ink-receiving layer composition had been uniformly applied was heated for 15 minutes in a first thermostatic chamber of 60° C. (first heat treatment), and was subsequently transferred into a second thermostatic chamber of 120° C. for a second heat treatment for 15 minutes. Thus, a test medium was prepared which includes a 80 μm thick ink-receiving layer on the 100 μm thick polyethylene terephthalate base.

(2) Application of Ink (Ink-Application Step)

An organic EL ink was applied to the surface of the ink-receiving layer of the test medium from an ink jet liquid ejecting apparatus. The organic EL ink contained 1 part by mass of poly(9,9'-dioctylfluorene-co-N-(4-butylphenyl) diphenylamine) (F8-TFB) and 99 parts by mass of dimethylnaphthalene. The organic EL ink was substantially colorless and had a transmittance of 95% or more for visible light having a wavelength of 500 nm.

(3) Observation (Observation Step)

The test media to which the ink had been applied were observed through an epi-illumination optical microscope at an angle of 0° between the central axis of lighting (extending in the epi-illumination direction) and the normal to the test medium for the positional accuracy of the ink droplets, the diameters (amounts) of the landed droplets, and the stain (satellites) of mist generated by ejecting the ink.

Examples 2 to 10

Test media was prepared in the same manner as in Example 1, except that the material of the sheet and the ink-receiving layer composition were changed as shown Table 1. Then, ink application and observation were performed on the test media in the same manner as in Example 1.

Comparative Example 1

The same sheet as used in Example 1, not provided with the ink-receiving layer, was used as the test medium, and ink application and observation were performed on the test medium in the same manner as in Example 1. In other words, in Comparative Example, the sheet was used as it is without being provided with the ink-receiving layer as the test medium.

Comparative Example 2

A plain paper (Super Fine Glossy Film MJA3NSP6 manufactured by Seiko Epson) was used as the test medium, and ink application and observation were performed on the test medium in the same manner as in Example 1.

Comparative Example 3

A test medium was prepared in the same manner as in Example 1, except that a mixture of carboxymethyl cellulose and hydroxyethyl cellulose was used as the ink-receiving layer composition, and then ink application and observation were performed on the test medium in the same manner as in Example 1.

Table 1 shows the test media used in the Examples and the Comparative Examples. In Table 1, PET represents polyethylene terephthalate; PBT, polybutylene terephthalate; PC, polycarbonate; PI, polyimide; PVC, polyvinyl chloride; PA, polyamide; POM, polyoxymethylene; and PPS, polyphenylene sulfide. Also, PVB 1 represents polyvinyl butyral containing 85% by mass of vinyl alcohol acetalized with butylaldehyde, 3% by mass of vinyl alcohol esterified with acetic acid, and 12% by mass of vinyl alcohol having a hydroxy group not etherified, acetalized, or esterified. PVB 2 represents polyvinyl butyral containing 83% by mass of vinyl alcohol acetalized with butylaldehyde, 3% by mass of vinyl alcohol esterified with acetic acid, and 14% by mass of vinyl alcohol having a hydroxy group not etherified, acetalized, or esterified, and PVB 3 represents polyvinyl butyral 78% by mass of vinyl alcohol acetalized with butylaldehyde, 3% by mass of vinyl alcohol esterified with acetic acid, and 19% by mass of vinyl alcohol having a hydroxy group not etherified, acetalized, or esterified. PVB 4 represents polyvinyl butyral containing 75% by mass of vinyl alcohol acetalized with butylaldehyde, 3% by mass of vinyl alcohol esterified with acetic acid, and 22% by mass of vinyl alcohol having a hydroxy group not etherified, acetalized, or esterified, and PVB 5 represents polyvinyl butyral containing 61% by mass of vinyl alcohol acetalized with butylaldehyde, 3% by mass of vinyl alcohol esterified with acetic acid, and 36% by mass of vinyl alcohol having a hydroxy group not etherified, acetalized, or esterified. AQ 7130 represents the solid portion of AQ 7130 (produced by Kusumoto Chemicals); PEI, polyether imide; ABS, acrylonitrile-butadiene-styrene copolymer; AS, acrylonitrile-styrene copolymer; MS, methyl methacrylate-styrene copolymer; PU, polyurethane; MBS, methyl methacrylate-butadiene-styrene copolymer; CMC, carboxymethyl cellulose; and HEC, hydroxyethyl cellulose. SB 5 represents C.I. Solvent Blue 5 used as a blue dye; SR 27, C.I. Solvent Red 27; SB 35, C.I. Solvent Blue 35; and SK 3, C.I. Solvent Black 3. The ink-receiving layer of each test medium of the Examples absorbed 0.2 g or more of ink per gram thereof, and the base of each test medium of the Examples absorbed 0.1 g or less of ink per gram thereof. The ink-receiving layer of the test medium of Comparative Example 3 absorbed 0.01 g or less of ink per gram thereof.

The ink absorption of each of the bases and ink-receiving layers was measured by the method described above.

(4) Evaluation

In the observation step, it was evaluated according to the following criteria how the positional accuracy and diameters of landed ink droplets and the satellites were observed.

(4. 1) Positional Accuracy

A: The positions of landed ink droplets were easily detected and the accuracy of the positions was easily measured.

B: The positions of landed ink droplets were rather difficult to detect, but the accuracy of the positions was able to be measured.

C: The positions of landed ink droplets were difficult to detect, and the accuracy of the positions could not be appropriately measured.

D: The positions of landed ink droplets were very difficult to detect, and the accuracy of the positions could not be measured.

(4. 2) Diameters of Landed Ink Droplets (Amount of Ink Droplets)

A: The contours of ink droplets were easily recognized and the diameters of the droplets were easily measured.

B: The contours of ink droplets were rather difficult to recognize, but the diameters of the droplets were able to be measured.

C: The contours of ink droplets were difficult to recognize, and the diameters of the droplets could not be appropriately measured.

D: The contours of ink droplets were very difficult to recognize, and the diameters of the droplets could not be measured.

(4. 3) Satellites

A: Satellites (stain) of mist generated by ejecting ink were easily detected, and the size of the mist was easily measured.

B: It was detected if there were satellites (stain) of mist generated by ejecting ink.

C: It was not able to be detected if there were satellites (stain) of mist generated by ejecting ink.

Figure 4:
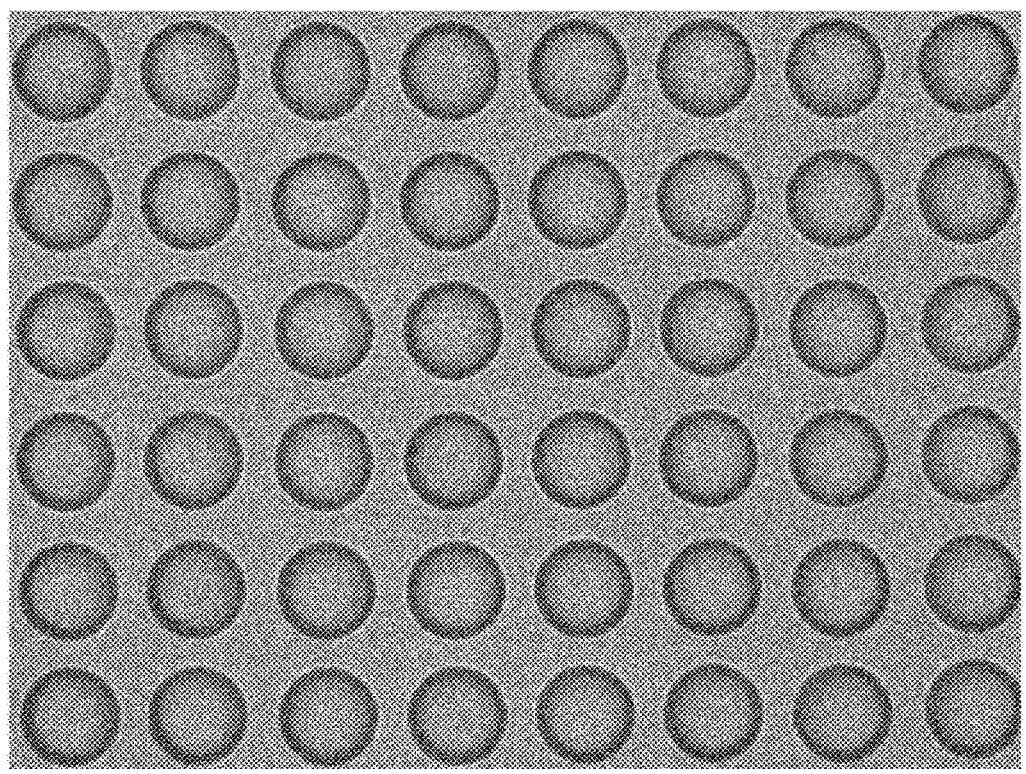
FIG. 4 is a micrograph of an ink-absorbed test medium of Example 1 taken through an epi-illumination optical microscope.
Figure 5:
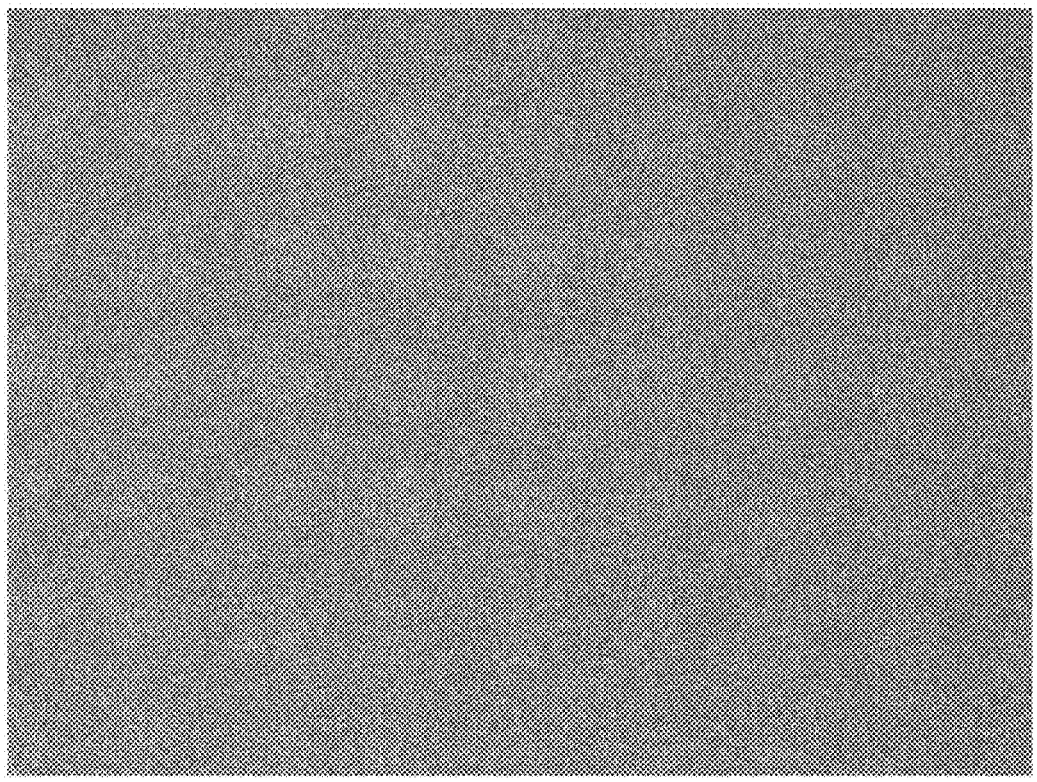
FIG. 5 is a micrograph of an ink-absorbed test medium of Comparative Example 1 taken through an epi-illumination optical microscope.

The results are shown in Table 2. Also, FIGS. 4 and 5 show the epi-illumination micrographs of test media to which ink was applied in Example 1 and Comparative Example 1, respectively.

TABLE 1

| | Base | | Ink-receiving layer | | |
|---|---|---|---|---|---|
| | Material | Thickness (μm) | Structure | Contents (part(s) by mass) | Thickness (μm) |
| Example 1 | PET | 100 | PVB1/AQ7130/SB5 | 90.1/0.9/9.0 | 80 |
| Example 2 | PBT/Carbon | 100 | PVB1/PEI/AQ7130/SB5 | 75.5/18.9/0.9/4.7 | 200 |
| Example 3 | PET/TiO2 | 100 | PVB1/PEI/AQ7130/SB5 | 57.3/37.4/0.9/4.4 | 300 |
| Example 4 | PC | 200 | PVB2/ABS/AQ7130/SB5 | 75.5/18.9/0.9/4.7 | 400 |
| Example 5 | PC | 200 | PVB2/AS/AQ7130/SK3 | 75.5/18.9/0.9/4.7 | 400 |
| Example 6 | PI | 60 | PVB3/MS/AQ7130/SR27 | 72.1/18.0/0.9/9.0 | 100 |
| Example 7 | PVC | 500 | PVB4/PU/AQ7130/SB5 | 72.1/18.0/0.9/9.0 | 500 |
| Example 8 | PA | 100 | PVB5/MBS/AQ7130/SK5 | 72.1/18.0/0.9/9.0 | 12 |
| Example 9 | POM | 50 | PVB1/PEI/AQ7130/SB35 | 77.3/19.3/1.0/2.4 | 500 |
| Example 10 | PPS/Carbon | 50 | PVB1/PEI/AQ7130/SB35 | 75.5/18.9/0.9/4.7 | 50 |
| Comparative Example 1 | PET | 100 | — | — | — |
| Comparative Example 2 | Plain paper | 185 | — | — | — |
| Comparative Example 3 | PET | 100 | CMC/HEC | 50/50 | 100 |

TABLE 2

| | Positional accuracy | Droplet diameter (amount of droplet) | Satellite |
|---|---|---|---|
| Example 1 | A | A | A |
| Example 2 | A | A | A |
| Example 3 | A | A | A |
| Example 4 | A | B | A |
| Example 5 | A | A | A |
| Example 6 | B | B | A |

TABLE 2-continued

|  | Positional accuracy | Droplet diameter (amount of droplet) | Satellite |
|---|---|---|---|
| Example 7 | A | A | A |
| Example 8 | A | B | B |
| Example 9 | A | A | A |
| Example 10 | A | B | A |
| Comparative Example 1 | D | D | C |
| Comparative Example 2 | D | D | C |
| Comparative Example 3 | D | D | C |

Table 2 shows that the amount and potions of ink droplets ejected by an ink jet method and satellites of mist generated by ejecting ink were accurately detected or measured in each Example of the test method according to the invention. On the other hand, the Comparative Examples did not provide satisfactory results.

The entire disclosure of Japanese Patent Application No. 2013-360, filed Jan. 7, 2013 is expressly incorporated by reference herein.

What is claimed is:

1. A test method comprising:
preparing a test medium including a base and an ink-receiving layer that absorbs ink to swell in the thickness direction of the ink-receiving layer;
applying an ink onto the ink-receiving layer by ejecting droplets of the ink from a liquid ejecting apparatus by an ink jet method; and
observing a contrast between a contour of a first portion of the test medium, that has absorbed the ink and swelled in the thickness direction, and a second portion of the test medium, that has absorbed the ink less than the first portion, the second portion being adjacent to the first portion.

2. The test method according to claim 1, wherein the observing of the test medium is performed through a microscope including an epi-illumination lighting device.

3. The test method according to claim 1, wherein the observing of the test medium includes measuring the volume of the droplets ejected from the liquid ejecting apparatus.

4. The test method according to claim 1, wherein the observing of the test medium including detecting positional information of the droplets ejected from the liquid ejecting apparatus.

5. The test method according to claim 1, wherein the observing the test medium includes detecting stain of mist generated by ejecting the droplets.

6. The test method according to claim 1, wherein the ink-receiving layer absorbs 0.2 g or more of the ink per gram thereof, and the base absorbs 0.1 g or less of the ink per gram thereof.

7. The test method according to claim 1, wherein the ink-receiving layer is made of a material containing a coloring agent.

8. The test method according to claim 1, wherein the ink-receiving layer contains polyvinyl butyral.

9. The test method according to claim 8, wherein the polyvinyl butyral contains 10% to 40% by mass of vinyl alcohol having a hydroxy group that is not acetalized or etherified, or esterified.

10. The test method according to claim 1, wherein the ink-receiving layer is made of a material containing an anionic acrylic silicone.

11. The test method according to claim 1, wherein the ink-receiving layer has a thickness in the range of 10 to 500 μm.

12. The test method according to claim 1, wherein the base contains a compound selected from the group consisting of polyethylene terephthalate, polybutylene terephthalate, polycarbonate, polyimide, polyacrylate, polyacetal, polyvinylidene chloride, and polyphenylene sulfide.

13. The test method according to claim 1, wherein the ink contains an organic solvent having a boiling point of 100° C. or more.

14. The test method according to claim 1, wherein the ink contains an aprotic aromatic compound as a liquid component.

15. The test method according to claim 1, wherein the ink does not contain a coloring agent.

* * * * *